US009400340B2

(12) United States Patent
Inanc

(10) Patent No.: US 9,400,340 B2
(45) Date of Patent: Jul. 26, 2016

(54) SOURCELESS DENSITY MEASUREMENTS WITH NEUTRON INDUCED GAMMA NORMALIZATION

(71) Applicant: BAKER HUGHES INCORPORATED, Houston, TX (US)

(72) Inventor: Feyzi Inanc, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 589 days.

(21) Appl. No.: 13/892,951

(22) Filed: May 13, 2013

(65) Prior Publication Data

US 2014/0336936 A1    Nov. 13, 2014

(51) Int. Cl.
| | |
|---|---|
| *G01V 5/10* | (2006.01) |
| *G01V 5/12* | (2006.01) |
| *G01V 5/08* | (2006.01) |
| G01V 13/00 | (2006.01) |
| G01T 1/40 | (2006.01) |
| G01T 7/00 | (2006.01) |

(52) U.S. Cl.
CPC ........ *G01V 5/101* (2013.01); *G01V 5/08* (2013.01); *G01V 5/12* (2013.01); *G01T 1/40* (2013.01); *G01T 7/005* (2013.01); *G01V 13/00* (2013.01)

(58) Field of Classification Search
CPC .......... G01T 7/005; G01T 1/40; G01V 13/00; G01V 5/00; G01V 5/12; G01V 5/101
USPC ............... 702/8; 250/256, 252.1, 255, 269.6, 250/269.1, 269.5
See application file for complete search history.

(56) References Cited

U.S. PATENT DOCUMENTS

| | | | |
|---|---|---|---|
| 4,122,338 A | 10/1978 | Smith, Jr. et al. | |
| 4,228,350 A | 10/1980 | Paap et al. | |
| 4,263,509 A * | 4/1981 | Fertl | E21B 49/00 250/255 |
| 4,501,964 A | 2/1985 | Arnold | |
| 4,731,531 A | 3/1988 | Handke | |
| 4,937,446 A | 6/1990 | McKeon et al. | |
| 5,128,541 A | 7/1992 | Mahdavi et al. | |
| 5,143,654 A * | 9/1992 | Kikuchi | G21F 9/008 588/4 |
| 5,374,823 A | 12/1994 | Odom | |
| 5,459,314 A * | 10/1995 | Plasek | G01V 5/12 250/264 |

(Continued)

OTHER PUBLICATIONS

Int'l Search Report and Written Opinion in PCT/US2014/037467 dated Sep. 17, 2014.

(Continued)

*Primary Examiner* — Carol S. W. Tsai
(74) *Attorney, Agent, or Firm* — Mossman Kumar & Tyler PC

(57) ABSTRACT

Methods, systems, devices, and products for estimating at least one parameter of interest of a volume of an earth formation, including density, porosity, and fluid saturation of the volume. Methods may include normalizing radiation information relating to radiation emissions from a spatially distributed nuclear source and indicative of a property of the earth volume using a correction factor determined using an estimated lithology of the volume. The nuclear source may be in the volume. Radiation emissions may be generated by neutron irradiation of at least one nuclide in the volume. The correction factor may be determined using any of: nuclear density of the at least one nuclide; an estimated concentration of the at least one nuclide in the volume; or a parameter relating to concentration of the nuclide in the volume. The emissions may include gamma rays.

16 Claims, 3 Drawing Sheets

(56) References Cited

U.S. PATENT DOCUMENTS

| | | | | |
|---|---|---|---|---|
| 5,672,876 | A | * | 9/1997 | Baba .................... G01N 23/083 250/358.1 |
| 6,207,953 | B1 | | 3/2001 | Wilson |
| 6,607,886 | B2 | | 8/2003 | Hovig et al. |
| 7,205,535 | B2 | | 4/2007 | Madigan et al. |
| 7,554,081 | B2 | | 6/2009 | Riley et al. |
| 7,566,869 | B2 | | 7/2009 | Riley et al. |
| 7,630,469 | B2 | | 12/2009 | Akers |
| 7,933,718 | B2 | | 4/2011 | Mcdaniel et al. |
| 8,101,907 | B2 | * | 1/2012 | Jacobi .................... G01V 5/101 250/256 |
| 2001/0048730 | A1 | * | 12/2001 | Oshima ................ G01N 23/222 376/157 |
| 2003/0161431 | A1 | | 8/2003 | Akers |
| 2007/0246649 | A1 | * | 10/2007 | Jacobi .................... G01V 5/101 250/269.6 |
| 2008/0156975 | A1 | * | 7/2008 | Kieschnick ........... E21B 25/005 250/255 |
| 2010/0252726 | A1 | | 10/2010 | Inanc et al. |
| 2010/0314535 | A1 | | 12/2010 | Zhang et al. |
| 2011/0112810 | A1 | * | 5/2011 | Scoullar ................ G01T 1/171 703/2 |
| 2011/0180697 | A1 | | 7/2011 | Inanc et al. |
| 2011/0191030 | A1 | | 8/2011 | Roberts |
| 2011/0213555 | A1 | | 9/2011 | Kopal et al. |
| 2011/0218735 | A1 | | 9/2011 | Han et al. |
| 2011/0257948 | A1 | | 10/2011 | McDaniel et al. |

OTHER PUBLICATIONS

Schlumberger, "NeoScope Sourceless LWD Service Delivers High-Quality Formation Evaluation Data for Apache," 2 pp. (2012).

Schlumberger, "Neoscope Sourceless formation evaluation while drilling," 7 pp. (2012).

Schlumberger, "NeoScope Sourcless Services Sves USD 500,000 in Offshore Exploration Well," 2 pp. (2012).

Schlumberger, "NeoScope Sourceless LWD Data Identifies GOC at High ROP to Land Offshore Well for Pearl Oil," 4 pp. (2012).

Schlumberger, "NeoScope Sourceless Neutron-Gamma Density Correlates to Conventional Density Measurement," 2 pp. (2012).

SPE102770, R. Pemper et al., "A New Pulsed Neutron Sonde for Derivation of Formation Lithology and Mineralogy," 13 pp., 2006 SPE Annual Technical Conference, San Antonio, TX (Sep. 24-27, 2006).

SPE102770 MS-P-Flex, R. Pemper et al., "A New Pulsed Neutron Sonde for Derivation of Formation Lithology and Mineralogy," 13 pp., 2006 SPE Annual Technical Conference, San Antonio, TX (Sep. 24-27, 2006).

SPE124234 MS-P-Flex. R. Pemper et al., "The Direct Measurement of Carbon in Wells Containing Oil and Natural Gas Using a Pulsed Neutron Mineralogy Tool," 14 pp., 2009 SPE Annual Technical Conference, New Orleans, LA (Oct. 4-7, 2009).

SPE143044, N. Reichel et al., "Compensated Neutron-Gamma Density for Formation Evaluation, Continuing Field Tests Demonstrate Improvements and New Features," 10 pp., SPE Europe/EAGE Annual Conference, Vienna, Austria (May 23-26, 2011).

SPE144890, A. Meunier et al., "Sourceless LWD Service Provides Unique Petrophysical Measurements for the First Time in Offshore Environment: A Case Study from Libya," 14 pp., SPE Offshore Europe Oil and Gas Conferfence, Aberdeen, UK (Sep. 6-8, 2011).

N. Reichel et al., "Neutron-Gamma Density (NGD): Principles, Field Test Results and Log Quality Control of a Radioisotope-Free Bulk Density Measurement," 15 pp., SPWLA 53rd Annual Logging Symposium (Jun. 16-20, 2012).

North Sea E&P Trends, Statoil's IOR Strategy, Offshore World Trends and Technology for Offshore Oil and Gas Operations, 2 pp. (Aug. 2012).

D. Denney, "Sourceless Formation Evaluation While Drilling," 1 p. SPE Jnl of Petroleum Technology (Sep. 2012).

G. Artigas, Apache Corp., "Sourceless formation evaluation reduces HSE risks," 3 pp., E&P Mag. (Dec. 2012).

Heisig, G., et al., "Downhole Diagnosis of Drilling Dynamics Data Provides New Level Drilling Process Control to Driller," SPE 49206, SPE Annual Technical Conference and Exhibition, New Orleans, LA (Sep. 27-30, 1998).

* cited by examiner

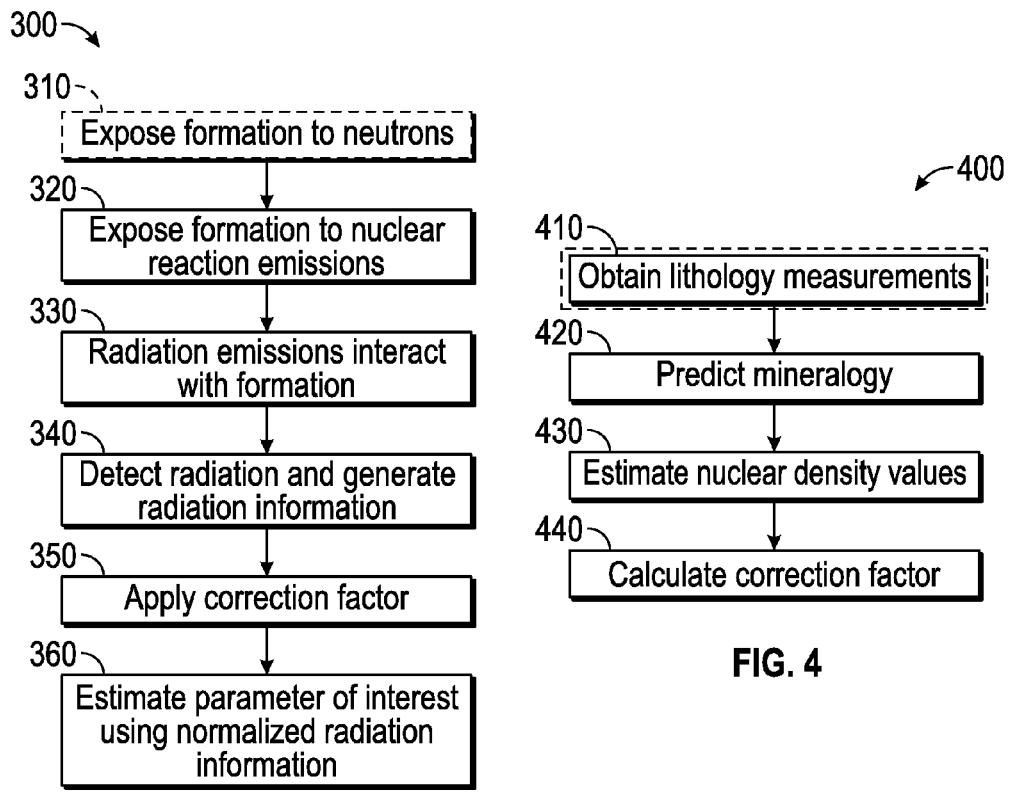
FIG. 3
FIG. 4
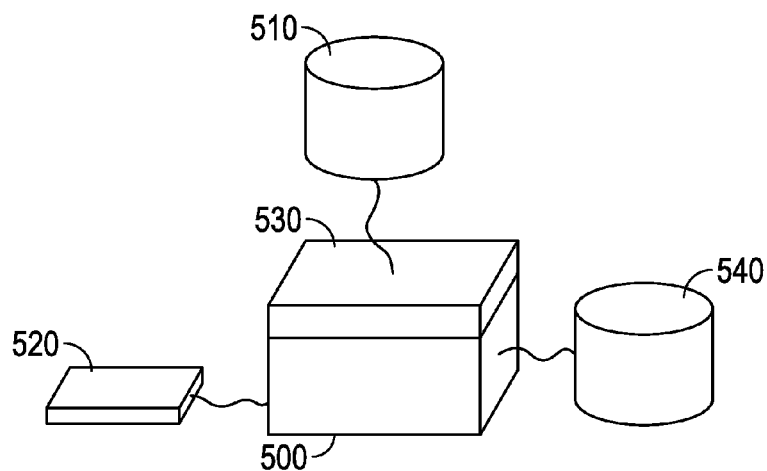
FIG. 5

SOURCELESS DENSITY MEASUREMENTS WITH NEUTRON INDUCED GAMMA NORMALIZATION

FIELD OF THE DISCLOSURE

This disclosure generally relates to borehole logging methods and apparatuses for estimating formation properties using nuclear radiation based measurements.

BACKGROUND OF THE DISCLOSURE

Oil well logging has been known for many years and provides an oil and gas well driller with information about the particular earth formation being drilled. In conventional oil well logging, during well drilling and/or after a well has been drilled, a nuclear radiation source and associated nuclear radiation sensors may be conveyed into the borehole and used to determine one or more parameters of interest of the formation. A rigid or non-rigid conveyance device is often used to convey the nuclear radiation source, often as part of a tool or a set of tools, and the carrier may also provide communication channels for sending information up to the surface.

SUMMARY OF THE DISCLOSURE

In aspects, the present disclosure is related to methods and apparatuses for estimating at least one parameter of interest of a volume of interest of an earth formation using nuclear radiation based measurements.

One embodiment according to the present disclosure may include a method of estimating at least one parameter of interest of a volume of an earth formation. Methods may include normalizing radiation information relating to radiation emissions from a spatially distributed nuclear source and indicative of a property of the earth volume using a correction factor determined using an estimated lithology of the volume. The nuclear source may be in the volume. Radiation emissions may be generated by neutron irradiation of at least one nuclide in the volume. The correction factor may be determined using any of nuclear density of the at least one nuclide; an estimated concentration of the at least one nuclide in the volume; or a parameter relating to concentration of the nuclide in the volume. The emissions may include gamma rays.

Another embodiment according to the present disclosure may include an apparatus for estimating at least one parameter of interest of a volume of interest of an earth formation comprising: a processor configured to normalize radiation information relating to radiation emissions from a spatially distributed nuclear source and indicative of a property of the earth volume using a correction factor determined using an estimated lithology of the volume.

Another embodiment according to the present disclosure may include a non-transitory computer-readable medium product for estimating at least one parameter of interest of a volume of an earth formation, comprising instructions disposed on the medium that, when executed by a processor, cause the at least one processor to: normalize radiation information relating to radiation emissions from a spatially distributed nuclear source and indicative of a property of the earth volume using a correction factor determined using an estimated lithology of the volume.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 3 shows a flow chart for a method for one embodiment according to the present disclosure;

FIG. 4 shows a flow chart for a method for one embodiment according to the present disclosure; and FIG. 5 shows a schematic of an apparatus for implementing one embodiment of the method according to the present disclosure.

DETAILED DESCRIPTION

Figure 1:
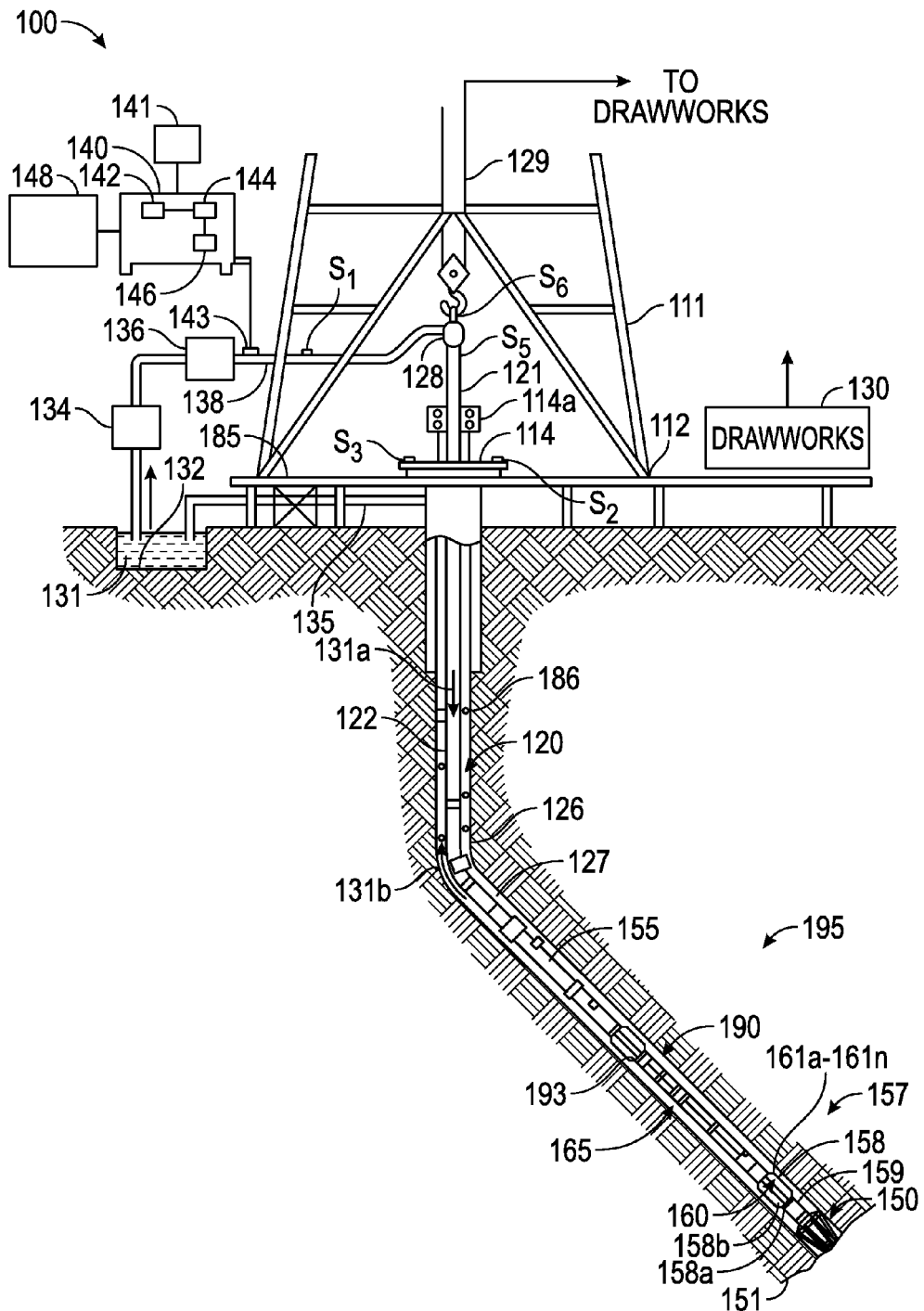
FIG. 1 shows a schematic of a downhole tool deployed in a borehole along a drill string according to one embodiment of the present disclosure.

In aspects, this disclosure relates to estimating at least one parameter of interest of a volume of interest using radiation induced by neutron irradiation. In some aspects, this disclosure relates to estimating a parameter of interest related to a volume from normalized radiation information. The volume may include an earth formation, such as, for example, an earth formation surrounding a borehole. The parameter of interest may be a physical characteristic of the volume, such as, for example, density.

Following neutron irradiation of the earth formation, interactions between the neutrons and nuclides in the formation may produce radiation (e.g., gamma rays). The application of neutrons may cause "activation" of specific nuclides (e.g., carbon, silicon, and oxygen) that may be found in a downhole environment. The activated nuclides may emit ionizing radiation, such as gamma rays. The term "activation" relates to the conversion of a normally stable nuclide into a radionuclide through a nuclear process, such as, but not limited to, neutron-proton (n,p) reactions and radiative capture (n,γ). Depending on the radionuclide, the delayed decay spectrum may have characteristics that allow the radionuclide to be used as a nuclear radiation source. Herein, the term "nuclear radiation" and "radiation emission" includes particle and non-particle radiation emitted by atomic nuclei during nuclear processes (such as radioactive decay and/or nuclear bombardment), which may include, but are not limited to, photons from neutron inelastic scattering and from neutron thermal capture reactions, neutrons, electrons, alpha particles, beta particles, and pair production photons.

For example, in typical downhole applications, there may be a significant amount of oxygen in the volume surrounding the borehole and in the borehole. A significant portion of the oxygen may be an oxygen-16 nuclide. When oxygen-16 is irradiated by neutrons, the interaction of the neutrons with the oxygen-16 nuclide may result in a nitrogen-16 radionuclide which may emit certain gamma rays. In another mode, fast neutrons can inelastically scatter from oxygen-16 nuclei and increase the nuclear energy states. This may result in a gamma emission so that the nucleus can go back to stable energy state. One or more nuclear radiation sensors disposed along the downhole tool may be configured to generate a signal indicative of nuclear radiation detected. The detected nuclear radiation may include gamma rays. Gamma rays (or other radiation emissions) resulting from neutron irradiation of nuclides in the formation may subsequently undergo interactions with the atoms making up the formation, before some of the gamma rays reach a detector. The flux of those gamma rays reaching a detector is therefore attenuated by the formation.

Conventional density measurements determine the count rates of the radiation that were emitted by a well characterized gamma ray source. The detected count rates are understood to correspond to the density of the formation. Through comparison of source intensity and the measured gamma ray intensity, a density value is estimated. Conventional density measurements in nuclear logging are based on having a very stable (predictable) radiation source with a substantially constant intensity. The source is unitary. For example, pre-existing gamma ray density measurement systems may utilize a point source of gamma rays, such as a Cesium-137 pill. The source emissions are therefore known or directly measurable. Small errors in the gamma ray source intensity value may be sufficient to corrupt the resulting density measurements.

Aspects of the present disclosure may relate to nuclear logging (e.g., nuclear density logging) using at least one radiation source apart from the tool. The radiation source may be a gamma ray source in the earth formation, such as nuclides irradiated by neutrons. Neutrons may interact with nuclides throughout the formation. Thus, in the present disclosure, the source may be spatially distributed in the formation. The source (and the source's radiation emissions) may be lithology dependent, and therefore unstable. As a result, variation in the count rates may thus be attributable to density of the formation, but may also be attributable to variation in the lithology of the formation and/or variation in borehole fluid types.

Aspects of the present disclosure may further relate to normalizing radiation information, such as emission rates (e.g., gamma ray count rates), relating to radiation emissions from a spatially distributed source in an earth formation. Normalizing the radiation information may be carried out using a correction factor determined using an estimated lithology of the volume. Normalization may adjust radiation information to be used for density measurements by mitigating effects of variations in the lithology and fluids in both formation and borehole. After normalization of the radiation information, it is certain that changes seen are due to density variations in the formation.

Each of the embodiments herein may be used in a variety of settings in both drilling and non-drilling environments. In some implementations, the disclosed embodiments may be used as part of a drilling system. FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The rate of penetration (ROP) for a given BHA largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors)

determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include a variety of other sensors and devices 159 for determining one or more properties of the BHA 190 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The drilling system 100 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 100 may include a bottomhole assembly and/or sensors and equipment for implementation of embodiments of the present disclosure on either a drill string or a wireline. A point of novelty of the system illustrated in FIG. 1 is that the surface processor 142 and/or the downhole processor 193 are configured to perform certain methods (discussed below) that are not in prior art.

Figure 2:
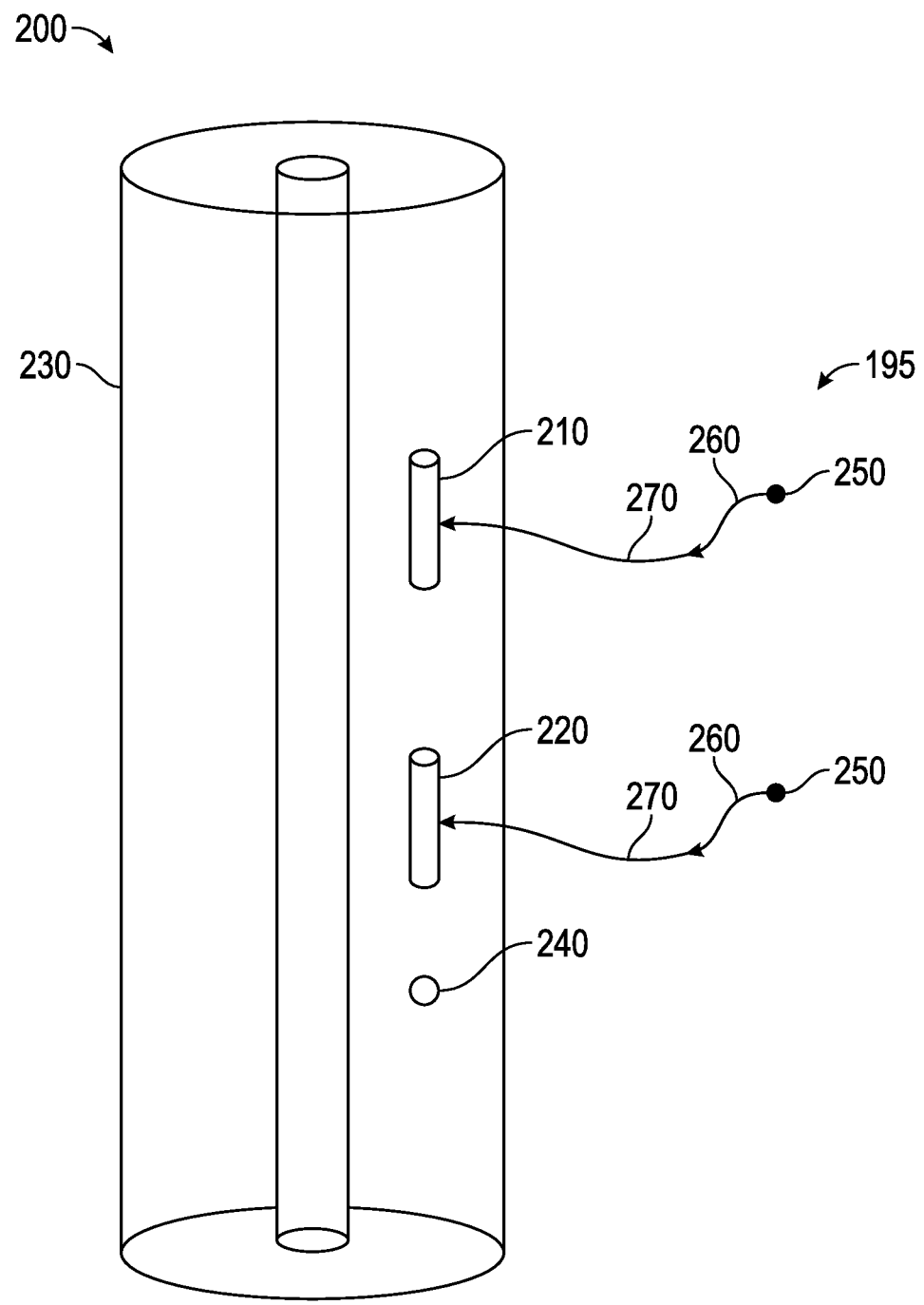
FIG. 2 shows a schematic of a nuclear sensor module for one embodiment according to the present disclosure.

FIG. 2 shows a nuclear detection module 200 that may be incorporated in BHA 190, such as along with evaluation sensors 165 according to one embodiment of the present disclosure. The nuclear detection module 200 may include one or more sensors 210, 220 configured to detect nuclear radiation disposed along a drill collar 230. The one or more nuclear radiation sensors 210, 220 may be spaced at different distances along the drill collar 230 apart from a neutron source 240. The radiation source 240 may be controllable in that the radiation source may be turned "on" and "off" while in the wellbore (or at the surface), as opposed to a radiation source that is "on" continuously. The measurements performed using this type of radiation may be referred to as "sourceless" measurements since they employ a source that may be turned off, as opposed to a continuously emitting chemical radiation source. When neutron source 240 is turned on, emitted neutrons may induce gamma ray emissions 250 in the earth formation 195. The gamma ray emitting nuclides 250 in the earth formation 195 may then serve as a spatially distributed radiation emission source, e.g., a gamma radiation source. When the neutron source 240 is turned off and after delayed neutron emissions have stopped, the radionuclides formed through nuclear reactions 250 may still be emitting nuclear radiation 260 into the earth formation 195. The interaction with the nuclear radiation 260 and the earth formation 195 may result in a nuclear radiation response 270 from the formation. Nuclear radiation response 270 may be the result of gamma ray scattering by the earth formation 195. Detectors 210, 220 may receive a nuclear radiation response 270 (e.g., scattered nuclear radiation) from the earth formation 195. In some embodiments, the nuclear detection module 200 may not include a neutron source 240, and the radionuclides in the earth formation 195 may be generated by neutron irradiation by another neutron source located in the borehole 126 or at the surface.

While a drill string is shown as a conveyance system for nuclear detection module 200, it should be understood that embodiments of the present disclosure may be used in connection with tools conveyed via rigid (e.g. jointed tubular or coiled tubing) as well as non-rigid (e.g. wireline, slickline, e-line, etc.) conveyance systems.

Neutron source 240 may be any neutron generator, including, but not limited to, a pulsed neutron generator and a chemical neutron source. The nuclear radiation sensors 210, 220 may include detectors configured to detect gamma rays. In some embodiments, the at least one parameter of interest may include density.

In contrast to existing density measurements, the gamma ray source is not a point source but a spatially distributed source (e.g., radionuclides 250). Prompt gamma ray emission rate from thermal capture and inelastic scattering nuclear reactions can be expressed as a product of nuclear density, microscopic cross section and neutron flux as shown below, $$S = \gamma N \sigma(E) \varnothing(E) \tag{1}$$

where S is the gamma ray emission rate, γ is the number of gamma photons emitted per each specific nuclear reaction, N is nuclear density of the nuclide that neutrons are interacting with, σ(E) is microscopic cross section for the given reaction type and the nuclide, Ø(E) is neutron flux. Some of those parameters vary with the energy of the incident neutron.

As shown in this equation, nuclear density of the nuclides targeted by neutrons play a direct role in prompt gamma ray emission. One typical nuclear reaction for a very fast 14 MeV neutron emitted by a pulsed neutron generator is inelastic scattering with the nuclides present in the target material.

In an earth formation, oxygen is an element that is typically present in large amounts, and an oxygen-16 nuclide has a sufficiently large inelastic scattering cross section, $\sigma(E)$, to generate significant amounts of prompt gamma rays from inelastic scattering reactions. In some cases, a significant amount of carbon (or other elements) may also be present in the formation. Additionally, a large portion of oxygen and carbon gamma rays may have energy in the 4-8 MeV range, so pair production is a significant interaction mechanism that is specific to the material in the formation.

Density measurements via nuclear logging benefit from a stable radiation source. Having a stable gamma ray source using gamma rays from a spatially distributed source, e.g., neutron inelastic scattering reactions and thermal capture reactions initiated by neutron irradiation of nuclides in the formation, requires stability of the parameters in equation (1). A stable neutron flux may be reasonably maintained over the logging period—it is possible to monitor the pulsed neutron source and account for any variations. Microscopic reaction cross section, $\sigma(E)$, is a property of the nuclide and does not change. Number of photons emitted per nuclear reaction, $\gamma$, does not change either. However, nuclear density changes with the formation lithology. Thus, the formation mineral type, porosity, fluid in the pore space, and fluid in the borehole affect the density measurements.

TABLE 1

Oxygen and Carbon Nuclear Densityi n Various Formation Materials

| Mineralogy | Oxygen Nuclear Density ($\times 10^{22}$) | Carbon Nuclear Density ($\times 10^{22}$) |
|---|---|---|
| Quartz (SiO$_2$) | 5.31 | — |
| 0.8 Quartz + 0.2 Water (v/v) | 4.92 | — |
| 0.8 Quartz + 0.2 Oil (v/v) | 4.25 | 0.69 |
| 0.8 Quartz + 0.2 Methane (v/v) | 4.25 | 0.15 |
| Calcium Carbonate (CaCO$_3$) | 4.90 | 1.63 |
| 0.8 CaCO$_3$ + 0.2 Water (v/v) | 4.58 | 1.31 |
| 0.8 CaCO$_3$ + 0.2 Oil (v/v) | 3.92 | 2.00 |
| 0.8 CaCO$_3$ + 0.2 Methane (v/v) | 3.92 | 1.46 |
| Kaolinite | 5.50 | — |
| Illite | 4.90 | — |
| Smectite | 5.20 | — |

Table 1 shows the variation of oxygen and carbon with respect to various formation materials. For example, there might be approximately a 7% change in oxygen nuclear density between pure sandstone and 20 pu water-saturated rocks. For a similar case that has oil rather than water, that change may be 20%. In contrast with the water-saturated case, oil-saturated rock will have carbon that may not be found in the pure quartz rock.

Calcium carbonate mineralogy may be another example. Three common clays, kaolinite, illite and smectite have significant amounts of oxygen. Those clays are likely to generate more oxygen gamma rays compared to higher porosity water saturated rocks.

As is readily apparent from the varying nuclear density values in Table 1, providing a constant gamma ray source in the formation for use in density measurements via neutron irradiation is not practical. Because conventional density measurements rely on change between the gamma ray source intensity values and the recorded gamma ray intensity values, obtaining accurate estimations of density (or related parameters of interest) may be problematic. Thus, normalization of the radiation information to compensate for nuclear density variability may be beneficial to increase accuracy of estimating a parameter of interest.

Since gamma count rates are originally driven by the inelastic scattering interactions between neutrons and elements of the formation, the necessary normalization factors may be determined from the concentration of oxygen, carbon and other relevant elements in the system, which may be estimated from predicted lithology, or more specifically, predicted mineralogy. A tool such as the Baker Hughes Formation Lithology eXplorer ('FLeX') tool can be used to provide such data.

Normalization may be carried out using predicted formation lithology established from neutron induced gamma spectroscopy, porosity, or NMR logs, or the like, either individually or in combination. Predicted formation lithology may include predicted formation mineralogy, porosity and fluids. It is well known to estimate the nuclear density of oxygen, carbon and other relevant elements in dependence upon such information.

FIG. 3 shows a flow chart 300 for estimating at least one parameter of interest of the earth formation according to one embodiment of the present disclosure. In optional step 310, neutron source 240 may be turned on to expose at least part of the earth formation 195 to neutron radiation. In step 320, the earth formation is exposed to prompt gamma rays the emitted through nuclear reactions. In step 330, interaction with the nuclear radiation emissions 260 and the earth formation 195 may result in nuclear radiation response 270 from earth formation 195. In step 340, detection occurs when one or more nuclear radiation sensors 210, 220 may generate radiation information in the form of signals in response to detected nuclear radiation emissions 260 and nuclear radiation responses 270. In step 350, the signals representing nuclear radiation 260, 270 may be normalized by applying a correction factor. The correction factor may be determined in dependence upon an estimated lithology of the formation containing the radionuclide and a model relating nuclear density and lithology. In step 360, a parameter of interest of the formation may be estimated using information relating to at least one nuclear radiation component of the earth formation 195.

Since a gamma ray count may include gamma rays from multiple elements, the gamma ray count information may be separated using a model into gamma ray components associated with each element. Herein, "information" may include raw data, processed data, analog signals, and digital signals. In some embodiments, the model may include, but is not limited to, one or more of: (i) a mathematical equation, (ii) an algorithm, (iii) an energy spectrum deconvolution technique, (iv) a stripping technique, (v) an energy spectrum window technique, (vi) a time spectrum deconvolution technique, and (vii) a time spectrum window technique. The gamma ray component for at least one nuclide may be used to estimate at least one parameter of interest of the earth formation. The at least one parameter of interest may include, but is not limited to, one or more of: (i) density, (ii) porosity, and (iii) fluid saturation. A description for some embodiments estimating the at least one parameter of interest follows below.

In some embodiments, estimation of the parameter of interest may involve applying a model. The model may include, but is not limited to, (i) a mathematical equation, (ii) an algorithm, (iii) an energy spectrum deconvolution technique, (iv) an energy spectrum stripping technique, (v) an energy spectrum window technique, (vi) a time spectrum deconvolution technique, (vii) a time spectrum window technique, or a combination thereof.

FIG. 4 shows a flow chart 400 for determining a correction factor according to one embodiment of the present disclosure. In optional step 410, lithology-related measurements are obtained. Lithology related measurements may include spectral gamma ray measurements, porosity related measurements, NMR logging measurement, and so on. In step 420, a processor may be used to predict mineralogy of the formation using the obtained measurements. Prediction of lithology from such information is very well known in the prior art. See, for example, the methods as described in "A New Pulsed Neutron Sonde for Derivation of Formation Lithology and Mineralogy" by Pemper et al, "The Direct Measurement of Carbon in Wells Containing Oil and Natural Gas Using a Pulsed Neutron Mineralogy Tool" by Pemper et al, and U.S. Pat. No. 8,101,907 B2 to Jacobi et al. Methods as disclosed in US Patent application publication 2011/0218735 to Han et al may also be used.

Natural gamma ray measurements may be subjected to an elemental analysis to give an estimate of K, Th, and U. Pulsed neutron measurements may be subject to an elemental analysis to give other elements such as Ca, Cl, Fe, Mg, Si, and S. The outputs of the elemental analyses, density measurements, and porosity measurements may be input to a constrained optimization module in a processor. The output of the constrained optimization module may be the mineralogy. Quadratic programming may include a quadratic objective function of the form $g^T x + \frac{1}{2} x^T H x$. Other constraints may include bound constraints (bl≤x≤bu), linear constraints (Ax≤b) and non-linear constraints (C(x)≤0). Here, g is the gradient of fat the current point x, f is the objective function, H is the Hessian matrix (the symmetric matrix of second derivatives). An objective function is minimized at each sample (depth) of the logs independently of the other depths. The objective function may be a summation from i to k of the value $(Logdata_i - f_i (component\ volumes))^2 / Var_i$. There are a total of k input logs which may include density, porosity, and photoelectric factor (PE) as well as the logs from elemental analysis. The function $f_i$ relates the mineralogy at each depth to the value of the i-th log. The weighting function $Var_i$ gives different weights to the different logs depending upon their accuracy. Generally speaking, density and porosity measurements have the largest weights.

In step 430, a processor may use the predicted mineralogy of the formation to estimate relevant nuclear density values. In step 440, a processor may calculate a correction factor using the relevant nuclear density values.

Methods of the present disclosure may include determining the concentration in the system (e.g., the formation and borehole fluid) of significant nuclides such as, for example, oxygen and carbon. This may be carried out using a neutron induced gamma ray mineralogy measurement obtained along with the density measurement system. The same can also be achieved by measuring sourceless density and using an existing mineralogy log from a previous logging run. In both cases, it is possible to estimate a total oxygen concentration and a total carbon concentration in the system. Since the oxygen and carbon amount is linearly correlated with the gamma ray source to be used for density measurements, the oxygen, carbon and any other relevant element concentration measurement may be used to normalize the gamma ray source. The methods herein may occur in real-time using a tool that has both density and neutron induced gamma mineralogy systems on board. Alternatively, a sourceless density log may be processed subsequent to the logging run with mineralogy data sufficient to estimate oxygen content, carbon content, and/or any other relevant element content for normalizing the gamma ray source. Either embodiment enables removal of all other variables from the measurement except the formation density.

As shown in FIG. 5, certain embodiments of the present disclosure may be implemented with a hardware environment that includes an information processor 500, a information storage medium 510, an input device 520, processor memory 530, and may include peripheral information storage medium 540. The hardware environment may be in the well, at the rig, or at a remote location. Moreover, the several components of the hardware environment may be distributed among those locations. The input device 520 may be any information reader or user input device, such as data card reader, keyboard, USB port, etc. The information storage medium 510 stores information provided by the detectors. Information storage medium 510 may be any standard computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 510 stores a program that when executed causes information processor 500 to execute the disclosed method. Information storage medium 510 may also store the formation information provided by the user, or the formation information may be stored in a peripheral information storage medium 540, which may be any standard computer information storage device, such as a USB drive, memory stick, hard disk, removable RAM, or other commonly used memory storage system known to one of ordinary skill in the art including Internet based storage. Information processor 500 may be any form of computer or mathematical processing hardware, including Internet based hardware. When the program is loaded from information storage medium 510 into processor memory 530 (e.g. computer RAM), the program, when executed, causes information processor 500 to retrieve detector information from either information storage medium 510 or peripheral information storage medium 540 and process the information to estimate a parameter of interest. Information processor 500 may be located on the surface or downhole.

A "spatially distributed source" may comprise a multitude of sources collectively. For example, the spatially distributed source may be spread throughout the formation. A source with "substantially constant intensity" may not change during logging, or the source intensity variation may be sufficiently small such that it is negligible with regard to estimation of density, porosity, or other parameter of interest. An "interaction" may be described as an event causing a change in energy and direction of incident radiation (e.g., a gamma ray) prior to measurement of the radiation and absorption of the radiation. An "interaction" may induce emission of secondary radiation as well (e.g. emission of a secondary neutron and/or gamma ray). Normalizing may refer to adjusting values measured on different scales to a notionally common scale, so that variation in the values corresponds to a variation of single factor. Formation lithology may include formation mineral type, porosity, and fluid in the pore space. Mineralogy may include the chemical composition and structure of minerals in the formation.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The "correction factor" may be applied in additive (or subtractive) or multiplicative fashion to the radiation information.

While the foregoing disclosure is directed to the one mode embodiments of the disclosure, various modifications will be apparent to those skilled in the art. It is intended that all variations be embraced by the foregoing disclosure.

What is claimed is:

1. A method of estimating at least one parameter of interest of a volume of an earth formation surrounding a borehole intersecting the earth formation, the method comprising: normalizing, by an information processing device including a microprocessor and a resident memory for executing programmed instructions, radiation information detected in the borehole using a correction factor determined using an estimated lithology of the volume, the radiation information relating to radiation emissions from a spatially distributed nuclear source in the volume and indicative of the at least one parameter of interest, the spatially distributed source created by neutron irradiation of at least one nuclide in the volume; and estimating the at least one parameter of interest using the normalized radiation information.

2. The method of claim 1, wherein the radiation emissions are generated by neutron irradiation of at least one nuclide in the volume.

3. The method of claim 1, wherein the correction factor is determined using nuclear density of at least one nuclide in the volume.

4. The method of claim 1, wherein the correction factor is determined using an estimated concentration of at least one nuclide in the volume.

5. The method of claim 1, wherein the correction factor is determined using a parameter relating to concentration of at least one nuclide in the volume.

6. The method of claim 1, wherein the at least one parameter of interest comprises density.

7. The method of claim 1, wherein the emissions include gamma rays.

8. The method of claim 1, further comprising estimating the at least one parameter of interest using the normalized radiation information.

9. The method of claim 2, wherein the neutron irradiation is carried out using a pulsed neutron generator.

10. The method of claim 1, further comprising:
generating the radiation information using a sensor in a borehole in the earth formation.

11. The method of claim 1, wherein the radiation information relates to a radiation emission rate from the spatially distributed nuclear source.

12. An apparatus for estimating at least one parameter of interest of a volume of an earth formation surrounding a borehole intersecting the earth formation, comprising: an information processing device including a microprocessor and a resident memory for executing programmed instructions to normalize radiation information detected in the borehole using a correction factor determined using an estimated lithology of the volume, the radiation information relating to radiation emissions from a spatially distributed nuclear source in the volume and indicative of the at least one parameter of interest, the spatially distributed source created by neutron irradiation of at least one nuclide in the volume; and estimating the at least one parameter of interest using the normalized radiation information.

13. A non-transitory computer-readable medium product for estimating at least one parameter of interest of a volume of an earth formation surrounding a borehole intersecting the earth formation, comprising: an information processing device including a microprocessor and a resident memory for executing programmed instructions to normalize radiation information detected in the borehole using a correction factor determined using an estimated lithology of the volume, the radiation information relating to radiation emissions from a spatially distributed nuclear source in the volume and indicative of the at least one parameter of interest, the spatially distributed source created by neutron irradiation of at least one nuclide in the volume; and estimating the at least one parameter of interest using the normalized radiation information.

14. The non-transitory computer-readable medium product of claim 13, wherein the radiation emissions are generated by neutron irradiation of at least one nuclide in the volume.

15. The non-transitory computer-readable medium product of claim 13, wherein the instructions further comprise instructions for determining the correction factor using nuclear density of at least one nuclide in the volume.

16. The non-transitory computer-readable medium product of claim 13, wherein the instructions further comprise instructions for determining the correction factor using an estimated concentration of at least one nuclide in the volume.

* * * * *